United States Patent [19]

Mandersson

[11] 4,080,235
[45] Mar. 21, 1978

[54] METHOD FOR PROVIDING A LAMINATE WEB WITH A FIRM EDGE STRIP

[75] Inventor: Ragnar Mandersson, Lund, Sweden

[73] Assignee: AB Ziristor, Lund, Sweden

[21] Appl. No.: 765,294

[22] Filed: Feb. 3, 1977

Related U.S. Application Data

[63] Continuation of Ser. No. 600,517, Jul. 30, 1975, abandoned.

[30] Foreign Application Priority Data

Aug. 15, 1974 Sweden .................................. 7410403

[51] Int. Cl.² ....................... B29D 23/10; B32B 31/00
[52] U.S. Cl. ..................................... 156/218; 156/258; 156/306
[58] Field of Search ............... 156/157, 159, 217, 218, 156/250, 257, 258, 259, 260, 264, 266, 267, 268–271, 304, 306; 428/57, 61, 48

[56] References Cited

U.S. PATENT DOCUMENTS

| | | | |
|---|---|---|---|
| 3,488,248 | 1/1970 | Long ................................. | 156/268 X |
| 3,531,350 | 9/1970 | Rausing et al. ...................... | 156/244 |
| 3,762,028 | 10/1973 | Swearingen et al. ............ | 156/306 X |
| 3,770,540 | 11/1973 | Fuchs et al. ......................... | 156/157 |

Primary Examiner—William A. Powell
Attorney, Agent, or Firm—Burns, Doane, Swecker & Mathis

[57] ABSTRACT

A laminated web comprising an internal base layer of paper faced with external thermoplastic layers is cut longitudinally into a plurality of separate webs each of which is then used in a packaging machine and formed into a tubular configuration with an overlapped edge seam. In order to prevent a "wicking" action at the internal base paper layer located on the inside of the package tube which could take place when the package is filled with a liquid, a mode of cutting the web into the separate strips is utilized wherein one of the plastic outer layers along one edge of each strip projects laterally beyond the edge of the internal paper layer and the edge of the opposite outer plastic layer. When each web is thereafter formed into a tube in the packaging machine by the overlapped seam technique, the laterally projecting edge portion of the plastic layer is then adhered to the adjacent plastic layer thus effectively sealing off the edge of the internal paper layer from the liquid contents of the package.

6 Claims, 3 Drawing Figures

METHOD FOR PROVIDING A LAMINATE WEB WITH A FIRM EDGE STRIP

This is a continuation of application Ser. No. 600,517 filed July 30, 1975, now abandoned.

The present invention relates to a method for providing a laminate web with a firm edge strip, and more particularly, to a method for producing, at the division of a laminate web comprising a central base layer with coating layers applied to either side into a number of separate webs, a strip of one of the layers of coating material projecting beyond the base layer.

A number of different types of disposable packages for liquid filling materials, e.g. milk, are known. The packages are usually manufactured from a laminated material which comprises a base layer of paper and layers of thermoplastic material applied to either side of the same. A known type of package is manufactured so that a web of laminated material stored in the form of a roll is folded to tubular form whilst it moves downwards through a packing machine, whereupon the overlapping zones of the web are sealed to one another and the filling material is filled in via a filler tube extending downwards into the tube. During continued downward movement the tube filled with filling material is sealed transversely with the help of sealing jaws, which with simultaneous supply of heat press together the tube walls so that a joint which is impervious to liquid is produced between the individual, still connected packages. After possibly further forming operations the sealed tube is divided into separate, complete packages by cutting through the said transverse sealing zones.

The longitudinal joint formed at the folding of the material web to a tube has the form of a lap joint, which means that one edge of the web is located inside the tube. Since the porous base layer is exposed at the edge, the filling material will be sucked up into the base layer unless measures are taken to prevent this. Until now the problem was solved by covering the exposed cut edge with the help of a loose strip of plastic material, which is applied over the joint on the inside of the tube directly after the formation of the joint. This loose plastic strip proved to be satisfactory in preventing the penetration of filling material into the base layer, but the application of the plastic strip brings with it an extra, undesirable operating stage in the manufacture of the packages. Moreover a strip application arrangement and various other additional devices are made necessary, which increase the risk of breakdowns.

One method to eliminate the problem of the loose strip is to provide the material web with a so-called fixed strip already in connection with the manufacture of the laminated material which is to be used in the packing machine, that is to say, allow one layer of coating material of the laminate to extend beyond the base layer at the one edge of the laminate web. Since the laminate webs which are manufactured in the laminating machines are several times wider than the material webs which are to be used in the packing machines, the original webs have to be divided into a number of narrower webs, whose width is adapted to the packing machines in which they are to be used. Thus it is not possible to produce the fixed strip earlier than in connection with the division of the original wide laminate web into narrower webs. However, until now it has not been possible to provide in an effective and economical manner the separate webs with a firm strip, and the methods known until now comprise either the fitting of a separate strip or the cutting off of parts of the base layer, so that unnecessary waste is produced.

It is an object of the present invention to eliminate the abovementioned difficulties and to specify a method for providing a laminate web with a firm edge strip, which method is simple and economical and can be carried out at the same time as the necessary division of the original material into narrower webs.

This object has been achieved in that a method of the type described in the introduction was given the characteristic that the laminate at each place of division is cut through partially from both sides, so that oppositely directed cuts originate which are laterally displaced in respect of one another by a distance corresponding to the desired width of the strip, that the one cut extends fully through the one layer of coating material, that the other cut extends fully through the other layer of coating material and substantially through the base layer, and that the webs formed by means of the cuts are removed from one another so, that the laminate strip situated between the cuts is caused to be delaminated.

Preferred embodiments of the method in accordance with the invention have the characteristics which are evident from the subsidiary claims.

The invention will be described in detail in the following with reference to the enclosed schematic drawing.

Figure 1:
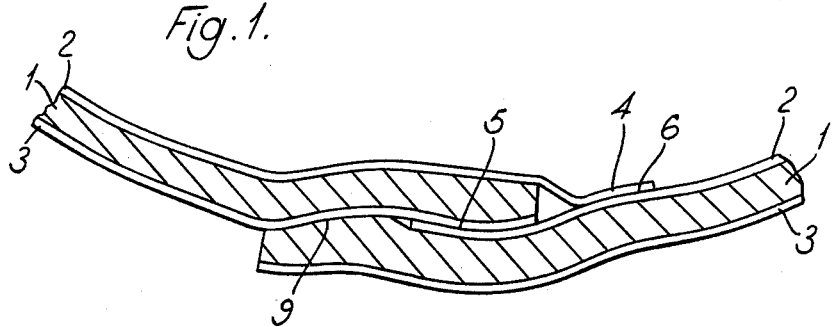
FIG. 1 shows on an enlarged scale a lap joint of the type which is produced at the joining of laminate webs in accordance with the invention.

The lap joint shown in FIG. 1 is of the same type as the longitudinal joint which in the process described in the introduction is formed when at the manufacture of individual packing containers the laminated material web is folded to tubular form. The upper side of the laminate in FIG. 1 constitutes the inside of the tube. The laminate is conventional and comprises a central base layer 1 and layers of coating material 2, 3 applied to either side of the same. On the material edge situated inside the tube extends a strip 4 of the layer of coating material 2 beyond the edge of the base layer 1. The strip 4 is joined at the formation of the lap joint to the layer of coating material 2 at the other edge area of the material web and prevents thereby the filling material from coming into contact with the base layer 1. The longitudinal joint is produced in that the edge areas of the material web are placed on top of one another, whereupon the layers of coating material resting against one another in the areas 5, 6 are made to fuse together by pressing and heating and so form a durable seal. To make possible the abovementioned sealing operation, the layers of coating material 2, 3 must comprise a heat-sealable material, e.g. polyethylene or the like, but it is understood, that each layer may also comprise other material layers, for example an aluminium foil, which is surrounded on both sides with a heat-sealable material.

Figure 2:
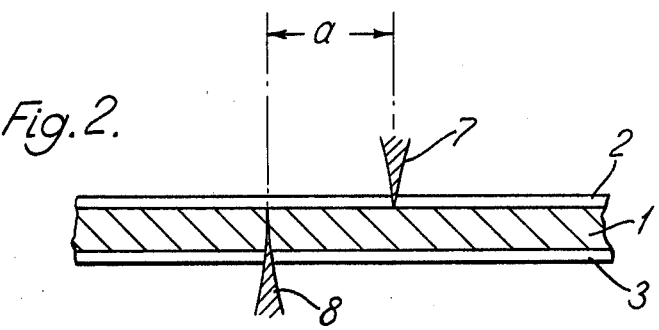
FIG. 2 is a cross-section through a laminate web and shows on an enlarged scale the placing of the cutting devices for the execution of the method in accordance with the invention.
Figure 3:
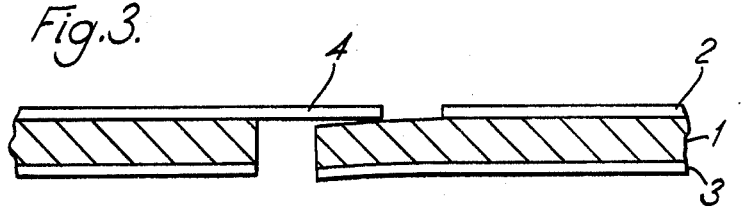
FIG. 3 is a cross-section through the laminate web in accordance with FIG. 2 during the division of the web into a number of separate webs.

FIGS. 2 and 3 illustrate the method in accordance with the invention, where at the division of a laminate web into a number of separate webs, at the same time the strip of the one layer of coating material extending beyond the base layer of the laminate is produced. As in FIG. 1 the base layer is indicated by reference numeral 1 and the layers of coating material by reference numerals 2 and 3 respectively. The laminated material is oriented in the same manner in all figures, i.e. the side of the material which forms or will subsequently form the inside of the packing tube is facing upwards. In FIG. 2 is shown an upper cutting device 7 and a lower cutting device 8. The cutting elements, which are of conventional type and e.g. may consist of rotating roller cutters, are stationary during the course of the work and the cutting is achieved in that the material is caused to pass the cutting device. The direction of feed of the material in FIG. 2 is perpendicular to the plane of the drawing.

It is evident from the placing of the cutting devices 7, 8 that either each by itself or both together will completely cut through the material web. Together the cutting devices 7, 8 certainly extend through the whole thickness of the material, but owing to their being displaced in respect of one another by a distance 'a' the cuts formed in the opposite surfaces of the material web will not reach one another but run parallel. Or, more precisely, the upper knife 7 will produce a cut which extends fully through the upper layer of coating material 2. To ensure that the material layer 2 is fully cut through, the cut extends moreover a slight way into the base layer 1. The bottom cutting device 8 performs in a similar manner a cut which extends wholly through the lower layer of coating material 3, and moreover almost completely through the base layer 1. To ensure that the bottom cutting device 8 does not injure the underside of the layer of coating material 2, the cutting device 8 is set so that it does not completely cut through the base layer 1.

When the method in accordance with the invention for the dividing of the laminated material web into a number of separate webs is carried out, therefore, two parallel cuts situated at opposite sides of the material and being laterally displaced in respect of one another will be produced at each place of division, one of which completely cuts through the layer of coating material 2 situated at the topside of the material, whilst the other completely cuts through the layer of coating material 3 situated at the underside of the material and almost completely cuts through the base layer 1.

This cutting procedure does not give rise, therefore, to any actual division of the laminate web into a number of separate webs. Instead the cuts produced serve as breaking directions when the narrower webs, indicated by the cuts, at the continued advance are removed from one another in lateral direction. At this separation a delamination will take place in the area situated between the cuts. The delamination takes place between the upper layer of coating material 2 and the base layer 1 along an area between the innermost parts of the cuts which are produced by means of the cutting devices 7, 8, and the cuts and delaminations together produce the desired division of the wider laminate web into separate, narrower webs, each of which is provided with a strip 4 of the layer of coating material 2 projecting beyond the base layer 1.

In the procedure described above it is assumed that the adhesion between the layer of coating material 2 and the base layer 1 is such, that the delamination can take place without difficulties. This is generally the case when the base layer is constituted of a fibrous material, e.g. paper or foamed plastic. In some cases, however, the adhesion between layers may make the abovementioned delamination more difficult, and in such cases it is appropriate to facilitate the delamination by giving inferior adhesive strength to the areas in which delamination is desired between the layer of coating material 2 and the base layer 1 already during the manufacture of the laminated material e.g. by application of a sealing inhibitor or by exerting less lamination pressure along the said areas.

The width of the projecting strip 4 of the layer of coating material 2 produced can be varied simply by alteration of the mutual distance 'a' between the cutting devices 7, 8. Likewise, the placing of the cutting devices can be varied to suit different material thicknesses.

In the above text a division of a laminate web into two separate webs with the help of a set of cutting devices 7, 8 was described, but it is also possible of course to divide the laminate web into any number of separate webs, if a number of sets of cutting elements 7, 8 are placed side by side.

On joining together the two edge areas of a laminate web into a lap joint for the formation of the longitudinal joint in a tube, the edge area 9 situated on the outside of the tube is not joined at all, or is joined only by means of an easily breakable seal to the outer layer of coating material 3 in the heat-sealing process, since the outer material edge lacks the part of the inner heat-sealable layer of coating material 2 corresponding to the strip 4. This is an advantage when a tearing thread for the opening of the package extends out through the joint, since the loose edge will then serve as a guide for the tearing thread.

The method in accordance with the invention thus makes it possible, at the same time as the original laminate web is divided into narrower individual webs, to provide each of these with a so-called firm strip. The production of the firm strip has no negative effect on the speed of operation of the machine and requires no additional operating stage. Moreover, the firm strip is produced without giving rise to any loss of material.

I claim:

1. A method of forming a tube from a longitudinal web cut from a laminated sheet having a base layer and at least one layer of thermoplastic material on each side thereof which comprises, cutting the laminated sheet substantially through only one layer of the thermoplastic material on that side of the laminated sheet which will form the inside of the tube and cutting substantially through only the opposite layer of thermoplastic material and the base layer on the other side of the laminated sheet, said cuts being spaced laterally from each other, separating that portion of the one layer of thermoplastic material between the cuts from the juxtaposed base layer to form the longitudinal web, each web having along one longitudinal edge thereof a portion of the one layer of thermoplastic material extending beyond the cut edge of the base layer and having along the opposed marginal edge thereof a portion free of the one layer of thermoplastic material, the width of the thermoplastic free portion being determined by the lateral distance between the cuts made in the laminated sheet, forming the longitudinal web into a longitudinal tube, sealing together the longitudinal edges of the web portion in overlapping relation so that the extended portion of the one layer of thermoplastic material is disposed on the inside of the tube and is sealed to the one layer of thermoplastic material adjacent the thermoplastic free portion of the opposed longitudinal edge of the web to form a continuous circumferential impervious layer of thermoplastic material on the inside of the tube.

2. A method as claimed in claim 1 and further comprising releasably sealing the thermoplastic free portion of the opposed longitudinal marginal edge to the opposite layer of thermoplastic material on the outside of the tube when sealing the longitudinal edges together.

3. A method as claimed in claim 1 wherein each layer of plastic material is a homogeneous plastic material.

4. A method as claimed in claim 1 wherein at least one of said layers of plastic material is provided with a layer of aluminum foil embedded therein.

5. A method as claimed in claim 1 wherein said base layer consists of foamed plastic material.

6. A method as claimed in claim 1 wherein said base layer consists of a fibrous material.

* * * * *